(12) United States Patent
Lampson et al.

(10) Patent No.: US 6,634,676 B1
(45) Date of Patent: Oct. 21, 2003

(54) ROTOMOLDED CONTAINMENT FITTING AND METHOD OF USE

(75) Inventors: Marshall Lampson, Galt, CA (US); Phil Larson, Stockton, CA (US); Raed Al Zubi, Stockton, CA (US); Tom Heacox, Manteca, CA (US); John Blanco, French Camp, CA (US)

(73) Assignee: Abell Corporation, Monroe, LA (US)

( * ) Notice: Subject to any disclaimer, the term of this patent is extended or adjusted under 35 U.S.C. 154(b) by 0 days.

(21) Appl. No.: 10/098,877

(22) Filed: Mar. 13, 2002

(51) Int. Cl.$^7$ ................................................ F16L 17/00
(52) U.S. Cl. .......................... 285/123.15; 285/123.17; 285/192; 220/601; 220/661
(58) Field of Search ................. 285/123.15, 123.17, 285/192, 368; 220/601, 661; 405/52, 53, 55

(56) References Cited

U.S. PATENT DOCUMENTS

| | | | |
|---|---|---|---|
| 1,343,169 A | * 6/1920 | Douglass | 220/62.18 |
| 2,594,599 A | * 4/1952 | Uhri | 220/251 |
| 3,448,889 A | 6/1969 | Malpas | |
| 3,693,495 A | * 9/1972 | Wagner | 411/377 |
| 4,492,392 A | * 1/1985 | Woods et al. | 285/119 |
| 4,715,513 A | 12/1987 | Shelton, Jr. | |
| 4,865,220 A | 9/1989 | Wiegand | |
| 4,871,081 A | 10/1989 | Ershig | |
| 4,934,654 A | 6/1990 | Linnemann | |
| 5,056,680 A | * 10/1991 | Sharp | 220/567.1 |
| 5,135,133 A | 8/1992 | Frost | |
| 5,141,260 A | * 8/1992 | Burwell | 285/123.17 |
| 5,273,180 A | 12/1993 | Whatley, Jr. | |
| 5,690,368 A | * 11/1997 | Johnson | 285/205 |
| 5,722,699 A | * 3/1998 | Brancher | 285/142.1 |
| 5,890,616 A | 4/1999 | Cravens et al. | |
| 5,909,818 A | * 6/1999 | Bateman | 220/601 |
| 6,173,997 B1 | 1/2001 | Nordstrom et al. | |
| 6,230,735 B1 | * 5/2001 | Bravo | 137/312 |
| 6,318,581 B1 | * 11/2001 | Garton | 220/565 |

* cited by examiner

Primary Examiner—Lynne H. Browne
Assistant Examiner—James M. Hewitt
(74) Attorney, Agent, or Firm—Robert N. Montgomery

(57) ABSTRACT

An inlet/outlet, rotomolded, flexible containment fitting for polyolefin double wall vessels attachable externally to a vessel's outer, sidewall. The molded flexible containment fitting having a corrugated wall portion and circular flanges at each end, one of which is attached to the outside of the containment vessel with the opposite flange having a pipe member extending internally through the fitting a pipe flange attached externally to the inner vessel wall thereby providing compensation for deflection, alignment, expansion and contraction of the inner vessel relative to the external containment vessel while still maintaining a secure fluid conduit through both the inner and outer vessel walls.

18 Claims, 5 Drawing Sheets

ROTOMOLDED CONTAINMENT FITTING AND METHOD OF USE

FIELD OF THE INVENTION

This invention relates generally to large storage tank inlet and/or outlet fittings and more particularly to double wall polyolefin tank combination inlet/outlet fittings with expansion and contraction capability.

GENERAL BACKGROUND

Flexible inlet/outlet fittings generally used with above ground storage vessels utilizing double wall containment often include a tubular connector to which external plumbing connections may be made to allow fluid to be pumped into and withdrawn from the storage tank. The inlet and/or outlet fitting may be plastic or metal. In some cases where metal fittings are used they may be substantially encased in plastic for protection from any corrosive chemicals that may be stored within the vessel or tank.

In the past, plastic or polyolefin storage tanks were not generally encased within a second tank or containment to insure against leakage. Therefore, polyolefin tanks were generally fitted with plastic or metal inlet/outlet fittings or with metal pipe flanges encased in plastic for providing fluid ingress or egress to the interior of the vessel or tank. With the proliferation of double wall or secondary containment vessels, it becomes more difficult to make a proper connection seal when penetrating both vessel walls. In most cases, pipes are usually positioned in an aperture that passes through the inner and outer walls of the vessels and secured thereto. The pipe is usually bonded to the walls of the tank or otherwise attached by plastic flanges to secure the pipe to the vessel walls.

In other applications, inlet and outlet pipes pass through a reservoir formed on the exterior of the tank to contain leaked fluid. In these applications the pipe is usually exposed to the corrosive environment to which the storage tank is exposed thereby precluding the use of metal pipe unless fully encased in a polymeric coating impervious to the chemicals involved. This frequently results in leaks or corrosion damage to the metal pipe and its fittings. In many cases where a secondary reservoir is used for leak protection, leaks can occur at the joints between the double walls of the reservoir around the pipe or pipefittings. Obviously, any type of leak can create a great deal of difficulty with a storage tank and limit the useful life of the vessel. More recent polyolefin storage tanks are made of reinforced plastic to resist the corrosive environment generally associated with harsh chemicals. Therefore, it becomes more essential that the inlet and outlet fittings and tubular connected thereto be compliant with the vessel specification.

Problems also occur when very large, dual wall plastic tanks are used. Such problems include misalignment of the inlet/outlet openings in the vessel that makes securing a fitting to each of the vessel walls very difficult.

Further, expansion, contraction, and flexing of the tank walls tend to break the seals around the inlet/outlet flanges. Where metal flange bolts are used to secure the fittings to tank walls, bolt heads are often eaten away as a result of corrosive chemicals in the tanks, thereby causing leakage. Therefore, it is highly desirable to have a more flexible fitting arrangement for penetrating polyolefin double wall tanks, as would the use of plastic pipe, plastic encapsulated fittings, and associated hardware. A flexible fitting is therefore required that would compensate for differential expansion and contraction of the inner and outer vessel walls.

SUMMARY OF THE INVENTION

The double wall tank or vessel fitting of the present invention is generally described as a series of elements including a pipe flange attachable externally to the inner vessel side wall by a plurality of bolts having plastic encapsulated heads inserted from the inside of the inner vessel wall and through apertures provided in the pipe flanges and secured thereto by nuts and washers. The fitting composition further includes a flexible containment fitting having a corrugated wall and circular flanges at each end, one end of which is attached to the exterior of the outer tank or containment vessel with similar bolts having encapsulated heads located between the walls of the two vessels. A pipe extending from the socket portion of a pipe flange attached to the exterior wall of the inner vessel extends through the flexible containment fitting and is captured therein by an external pipe flange fitting secured to the external end of the flexible containment fitting, the external flange fitting having a socket portion for receiving the pipe as necessary to accommodate fitting make-up. Compensation for deflection, alignment, and expansion of the inner vessel relative to the external containment vessel is absorbed by the flexible containment-fitting element.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DESCRIPTION OF THE PREFERRED EMBODIMENT

Figure 1:
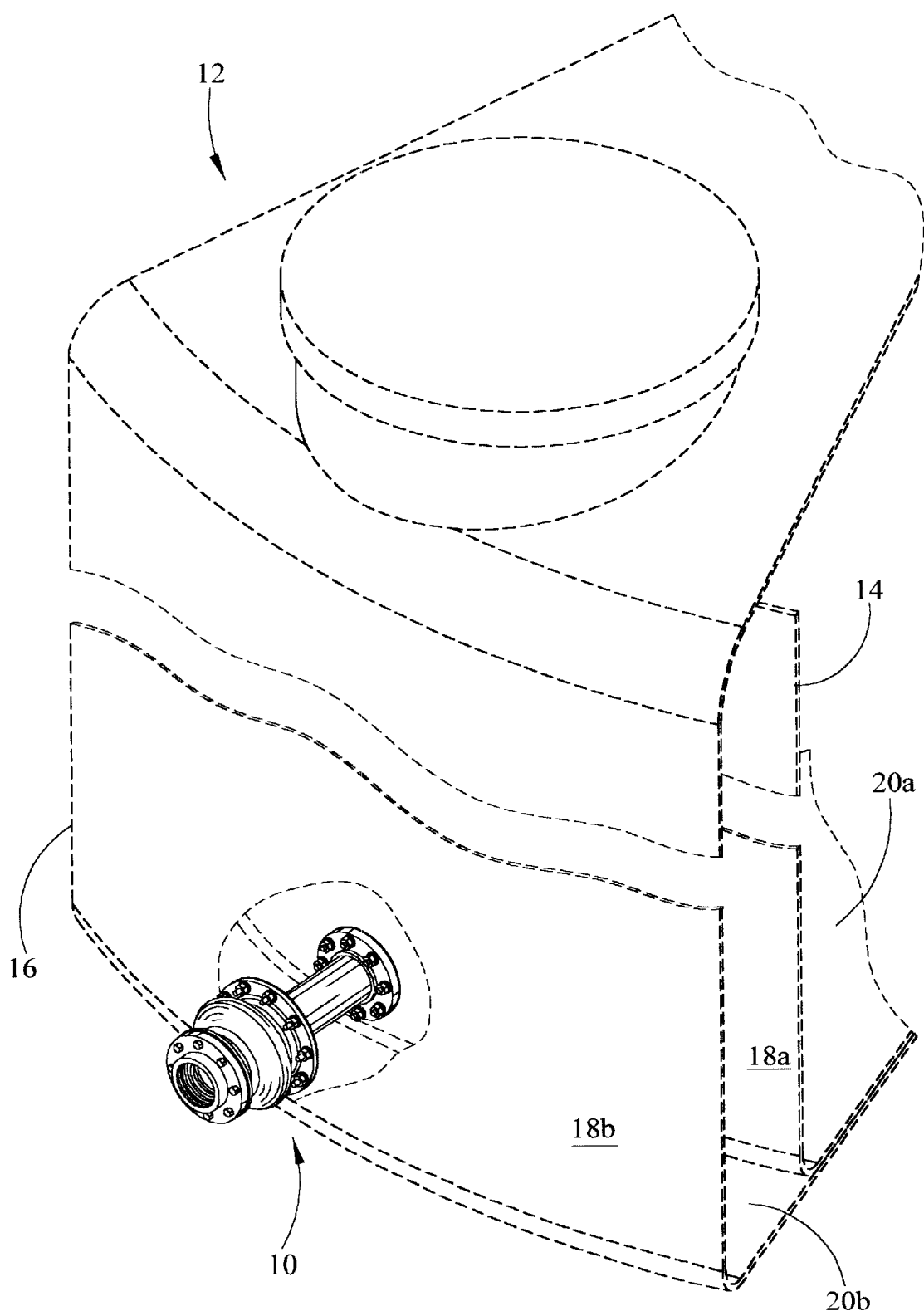
FIG. 1 is a vertical, partial section view of a double wall storage vessel with an inlet/outlet fitting installed.
Figure 7:
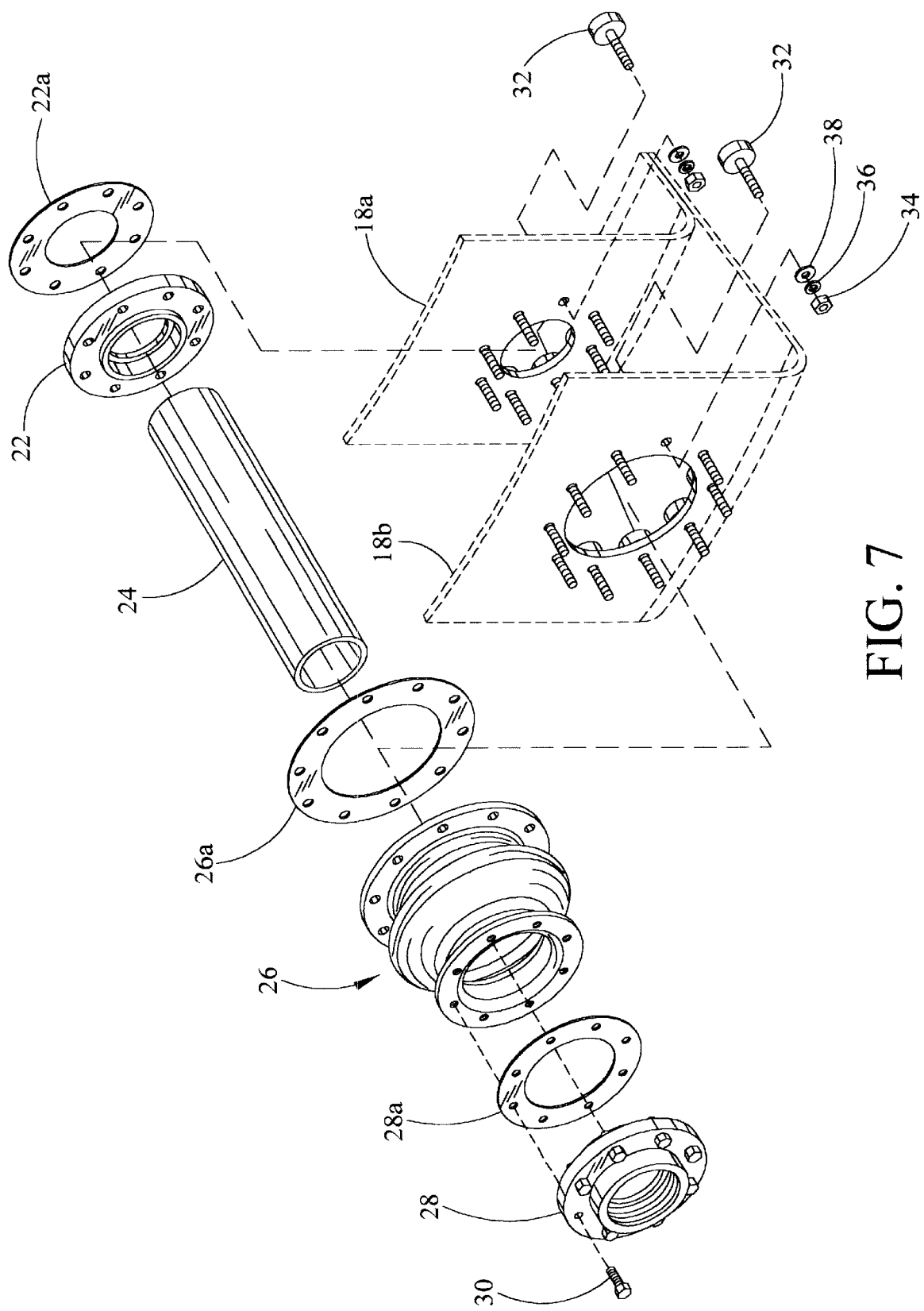
FIG. 7 is an isometric, exploded view of the preferred embodiment relative to a double wall tank.

Referring to the drawings and more particularly to FIG. 1, we see that the inlet/outlet fitting assembly 10 is useful in large double wall tanks or vessels 12 having an inner tank or vessel 14 and an external containment tank or vessel 16. The fitting assembly 10 is generally located in the side wall 18a of the inner vessel 14 and the side wall 18b of the external containment vessel 16 generally adjacent the bottom portions 20a, 20b of the vessels. The nomenclature of the fittings assembly 10 itself, as best seen in FIG. 7, includes a first, pipe flange 22 and its associated gasket 22a, a length of conductor pipe 24 having a diameter equivalent to the ID of said pipe flange 22, a molded flexible containment fitting element 26, its associated gasket 26a, and a second pipe flange 28 and its associated gasket 28a secured to the fitting element 26 with a plurality of bolts 30. Fitting assembly 10 is attached to the tank walls 18a and 18b by chemical resistive bolts 32 which may include polymeric encased heads and further secured with nuts 34 and washers 36, 38.

Figure 2:
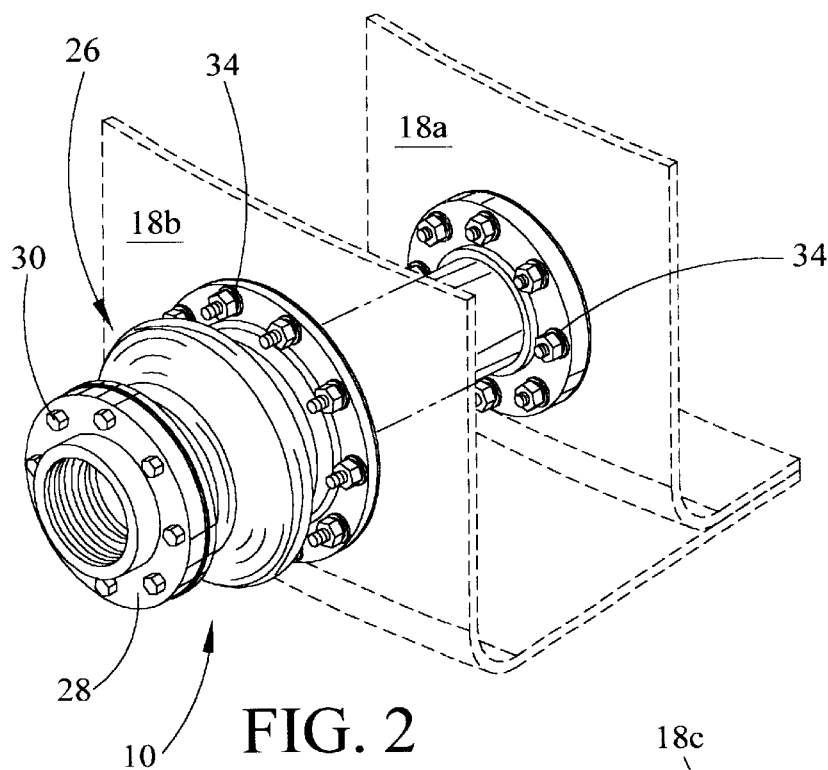
FIG. 2 is a partial frontal, isometric, and assembly view of the preferred embodiment relative to vessel fitting elements.
Figure 3:
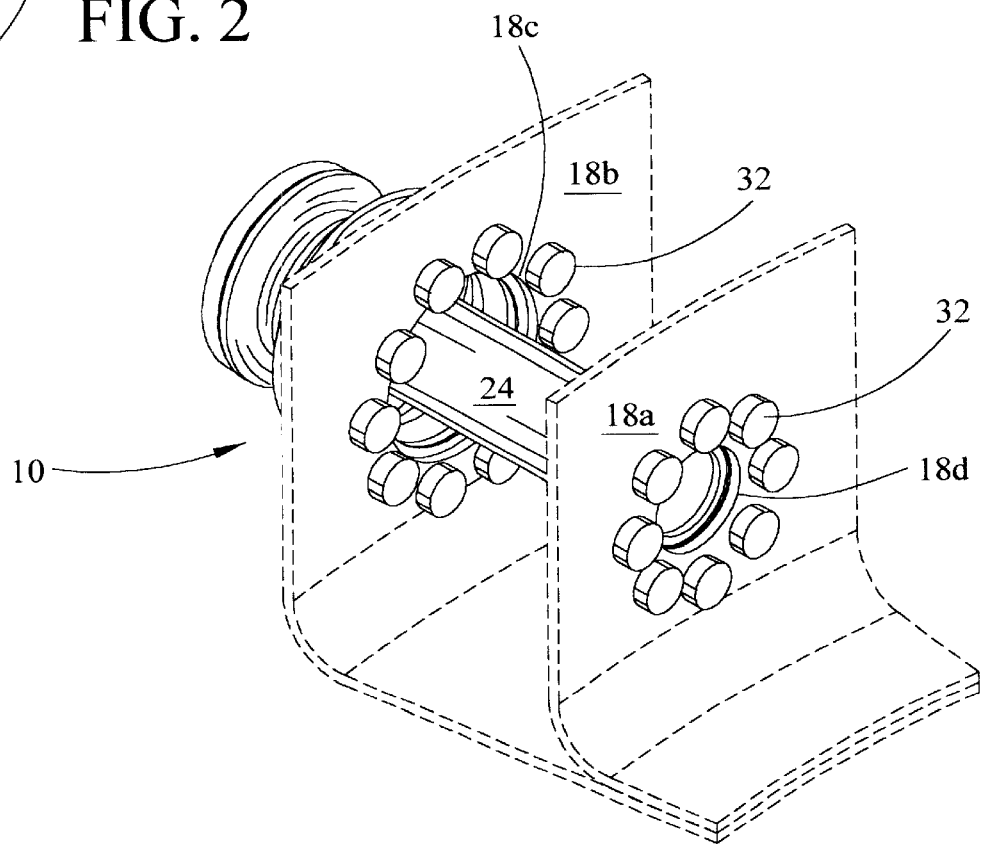
FIG. 3 is a partial interior, isometric, and assembly view of the preferred embodiment relative to vessel fitting elements.
Figure 4:
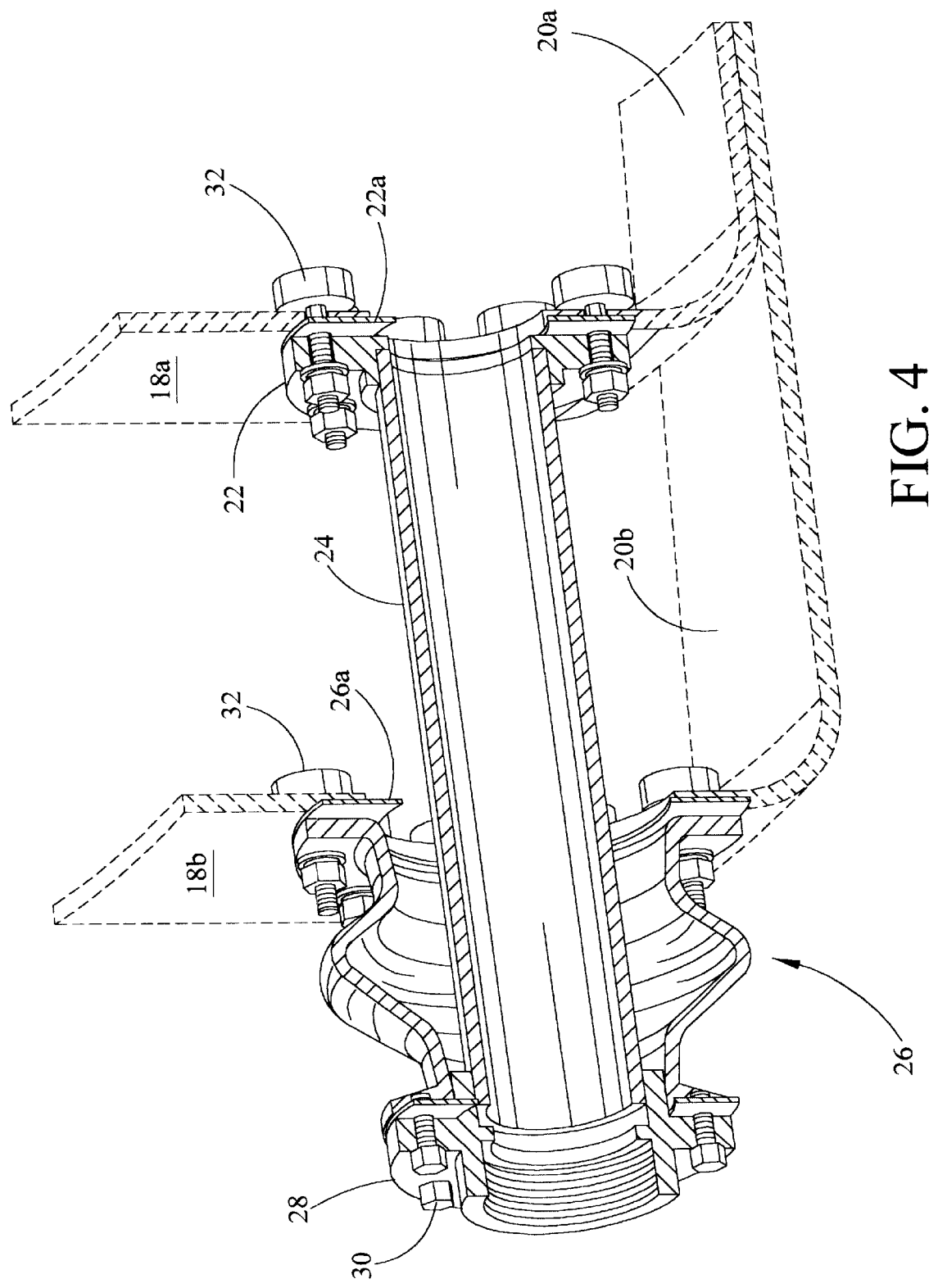
FIG. 4 is an isometric, cross section, and assembly view of the preferred embodiment.

As seen in the partial section view of FIG. 2, fitting assembly 10 is installed in the internal vessel 14 first illustrated in FIG. 1 with the first pipe flange attached externally to the wall 18a with bolts 32 and secured with nuts 34 and washers 36 and 38 in a manner whereby said polymeric encapsulated bolt heads are located inside the vessel 14 first shown in FIG. 1 and better seen in FIG. 3. Likewise, the molded flexible containment fitting element 26 is installed in the external containment vessels 16 with one of its flange portions attached externally to the wall 18b with bolts 32 and secured with nuts 34 and washers 36 and 38 in a manner whereby said poly encapsulated bolt heads are located inside the vessel 16 as shown in FIG. 3. An orifice is provided in each of the vessel walls 18a and 18b central to each pipe flange to accommodate passage of the conductor pipe 24. The conductor pipe orifice 18c located in vessel wall 18b is generally larger than the orifice 18d in vessel wall 18a to allow for misalignment between the inner and outer vessels 14 and 16. The diameter of the orifice 18c in the outer containment vessel wall should be of sufficiently size to pass the outer diameter of the inner vessel flange fitting 22 and thereby allow for its installation. As further detailed in FIG. 4, the pipe flange 22 is located in the inner vessel 14 wall 18a slightly above the vessel bottom portion 20a and secured therein with its gasket 22a by a plurality of bolts having plastic encapsulated heads 32. The pipe flange 22 may be a PVC socket type for receiving an end of a PVC conductor pipe 24 secured thereto by an adhesive. The pipe flange 22 may also be a bulkhead fitting. Either may be made of any applicable materials such as metal or polymers either having internal threads for receiving an externally threaded conductor pipe or sockets for receiving PVC conductor pipe or a combination thereof. In either case the conductor pipe 24 may be inserted into the pipe flange 22 and secured thereto after the internal vessel 14 is inserted into the external containment vessel 16 and the apertures are aligned. The molded, flexible, corrugated, containment fitting element 26 is attached externally to the external vessel wall 18b slightly above the vessel bottom portion 20b generally in alignment with the pipe flange 22 and secured therein with its associated gasket 26a by a plurality of bolts 32. Tubular pipe conduit 24 is passed through the rotomolded, flexible, containment-fitting assembly 26 and threaded or otherwise adhered to the pipe flange 22. As seen in FIG. 4, the tubular conduit does not contact the corrugated, flexible containment-fitting element 26.

Figure 5:
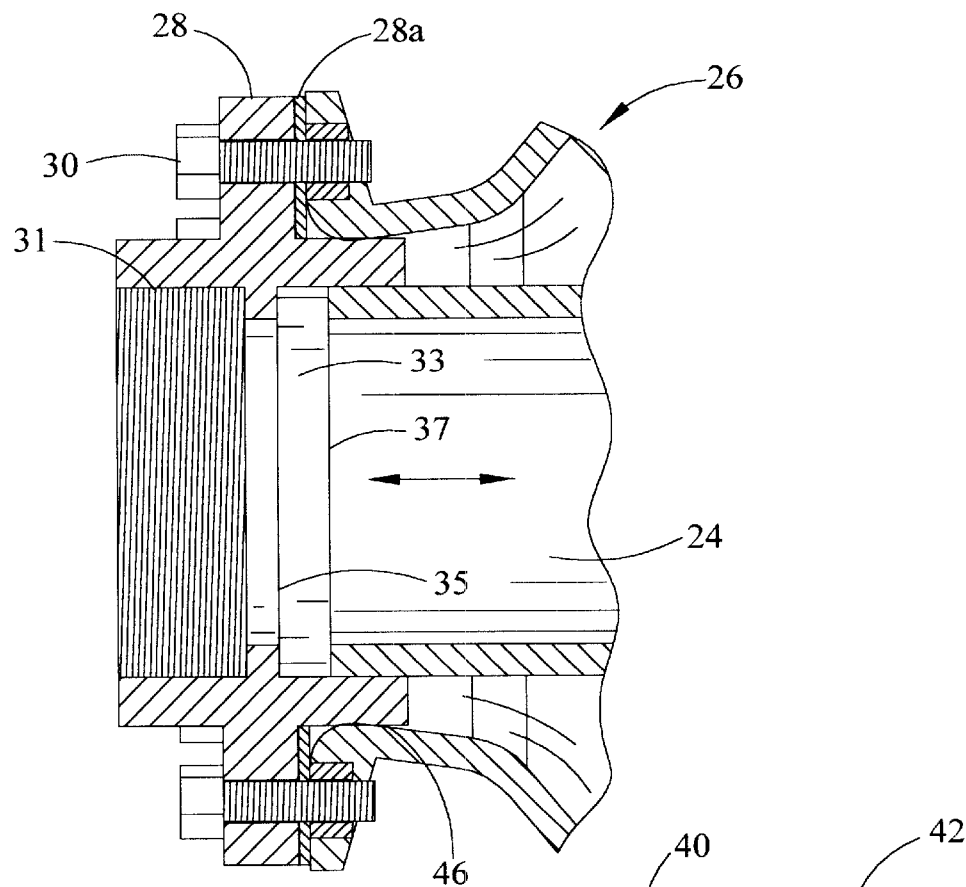
FIG. 5 is a close-up, partial, cross section view of the outermost connection flange.

Looking now at FIG. 5 we see that a second pipe flange 28 is provided for attachment to the outer end of the molded flexible boot or containment fitting element 26 opposite the external vessel wall 18b. Pipe flange 28 is a dual or double socket pipe flange element. However, the external socket portion 31 may be threaded, if desired, for external connection. The external flange 28 may also be PVC fitting if desired. A space 33 is also provided between the end 37 of the tubular conduit 24 and the internal shoulder 35 of the external pipe flange 28 to allow for ease of make-up. Upon final assembly the tubular member 24 is secured within the socket portion of the external flange 28 externally attached to the containment fitting 26.

Figure 6:
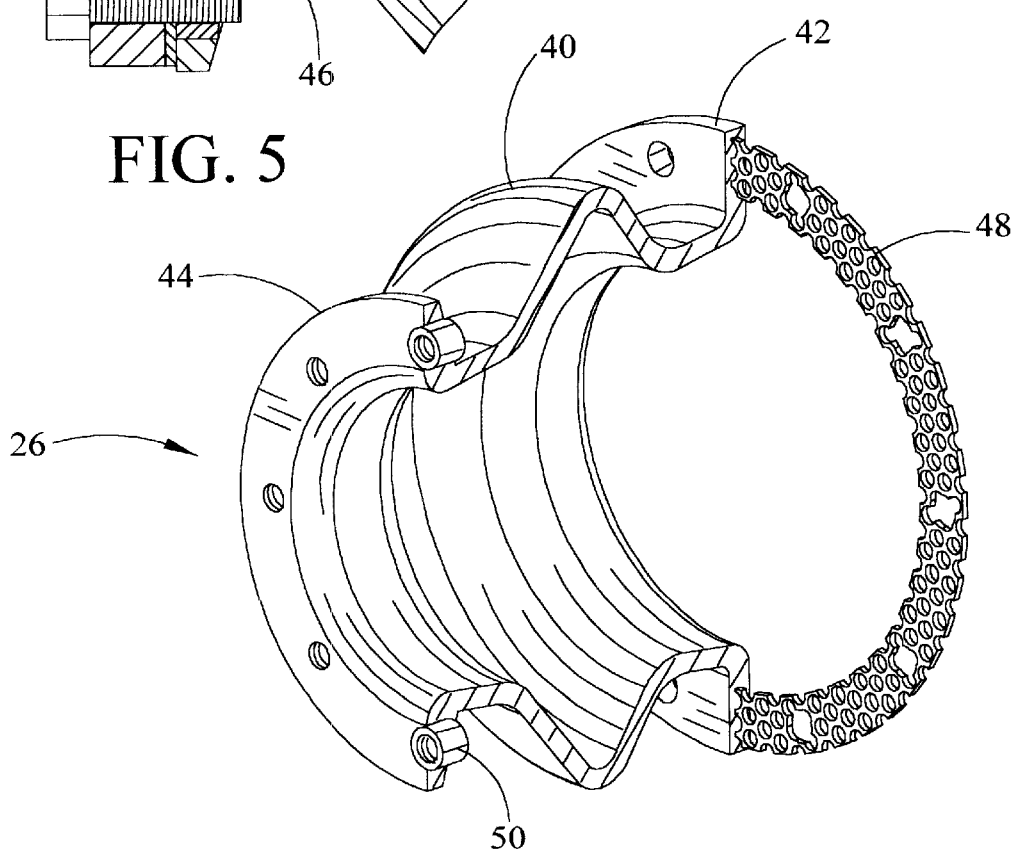
FIG. 6 is an isometric, cross section view of the flexible containment fitting element.

Finally, looking at FIG. 6, we see the molded boot or flexible containment fitting element 26 is molded of a flexible polymeric material and has a corrugated portion 40, a first flange portion 42, and second flange portion 44. The first flange portion 42 being somewhat larger than the second flange portion 44. For convenience, the flanges 42, 44 are equivalent to American National Standard (ANS) pipe sizes with standard boltholes and spacing. However, obviously the flanges may be custom made to any national standard or custom mated to any existing flange specification. The inside diameter of the outer flange 44 conforms to the outside diameter of the tubular portion of the double socket flange 28 as seen in FIG. 5. The first flange portion 42 includes a perforated metal reinforcing ring 48 molded integral with the flange. The outer flange 44 may also be integrally molded with threaded inserts 50 at each of the standard flange holes conforming to the bolt circle and hole spacing of standard pipe flange 28 seen in FIG. 6 drilled at assembly for threaded fastener and nut assembly or fitted with insertable threadalets.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An inlet/outlet flexible fitting assembly particularly suited for attachment to a polyolefin vessel enclosed by an outer containment vessel comprising:
   a) a first pipe flange attachable externally to said polyolefin vessel;
   b) a tubular conduit attachable at one end to said first pipe flange and extendable through an opening provided in said outer a wall of said outer wall containment vessel;
   c) a flexible corrugated boot having integrally molded first and second external flange portions, said boot surrounding said tubular conduit in a manner wherein said first flange portion is attached externally to an outer surface of said containment vessel at said opening; and
   d) a second pipe flange attached to said second flange portion of said boot and connected to an end of said tubular conduit opposite said first pipe flange.

2. The inlet/outlet flexible fitting assembly according to claim 1 wherein said second pipe flange further comprises a pipe connection means located on an end opposite said tubular conduit for attaching external pipe.

3. The inlet/outlet flexible fitting assembly according to claim 1 wherein said tubular conduit extends axially through said boot the length of said conduit is governed by the position of said inner vessel wall relative to said outer vessel wall.

4. The inlet/outlet flexible fitting assembly according to claim 1 wherein said first flange portion of said boot further comprises a perforated reinforcing ring integrally molded therein and said second flange portion of said boot further comprises thread inserts integrally molded therein.

5. An fluid inlet/outlet fitting assembly for vessels having leak containment shells with inner and outer vessel walls defining a space there between comprising:
   a) a first pipe flange and a second pipe flange;
   b) an elongated tubular member attached at one end to said first pipe flange, and
   c) a molded flexible boot having both a first and a second external flange portion said boot surrounding said tubular member with said first flange portion secured to said second pipe flange, said second flange portion of said boot is connected to an outer surface of said outer vessel wall; with said second pipe flange being attached to an end of said tubular member opposite said first pipe flange, said second pipe flange further comprising a threaded pipe connection means located adjacent said tubular member for attaching external pipe.

6. The fluid inlet/outlet fitting assembly according to claim 5 wherein said first pipe flange is removably attached externally to said inner vessel wall by a plurality of bolts having polymeric encapsulated heads.

7. The fluid inlet/outlet fitting assembly according to claim 6 wherein said polymeric encapsulated heads are located within said inner vessel wall.

8. The fluid inlet/outlet fitting assembly according to claim 7 wherein said second flange portion of said flexible boot is removably connected externally to said outer vessel wall by a plurality of bolts having polymeric encapsulated heads located between said inner and outer wall.

9. The fluid inlet/outlet fitting assembly according to claim 8 wherein said flexible boot further comprises a plurality of spaced apart, threaded inserts molded integrally within said first flange portion.

10. The fluid inlet/outlet fitting assembly according to claim 9 wherein said flexible boot further comprises a perforated metal ring molded integrally with said second flange portion.

11. The fluid inlet/outlet fitting assembly according to claim 5 wherein said first and second pipe flanges have sockets for receiving said elongated tubular member.

12. A flexible inlet/outlet fitting assembly for double wall polyolefin vessels having an inner vessel wall and an outer vessel wall, the walls having a space there between, the fitting comprising a molded, flexible, polymeric boot having a first and a second flange portion and a corrugated intermediate portion, a first pipe flange having at least one socket portion adapted to said first flange portion of the boot, said second flange portion of said boot being connected to an outer surface of said outer vessel wall, a second pipe flange having a socket portion connected externally to said inner vessel wall, and an elongated tubular member connected to said socket portion of said second pipe flange passing axially through said flexible boot and fitted in a longitudinal manner within at least one socket portion of said first pipe flange.

13. The flexible inlet/outlet fitting assembly according to claim 12 wherein said flexible boot and said second pipe flange are attached to said outer and inner vessel walls respectively with a plurality of bolts having polymeric encapsulated heads.

14. The flexible inlet/outlet fitting assembly according to claim 12 wherein said elongated tubular member is fixedly connected to said first pipe flange.

15. The flexible inlet/outlet fitting assembly according to claim 12 wherein said molded flexible boot further comprises a plurality of threaded inserts integrally molded into said first flange portion.

16. The flexible inlet/outlet fitting assembly according to claim 12 wherein said molded flexible boot further comprises a perforated reinforcing ring integrally molded into said second flange portion.

17. A method of compensating for expansion and contraction of double wall polyolefin vessels having an inner vessel surrounded by an outer vessel with a space between the vessel walls, relative to an inlet/outlet fitting assembly, a portion of which is connected to said inner vessel and passes through a wall of said outer vessel comprising the steps of:

provinding an inlet/outlet fitting assembly comprising:
  i) a first pipe flange;
  ii) a flexible boot having first and second flange portions and at least one corrugation portion, said first flange portion secured to said first pipe flange;
  iii) an elongated tubular member attached to said first pipe flange and passes axially through said flexible boot; and
  iv) a second pipe flange secured to an end of said tubular member opposite said first pipe flange;

b) attaching said second pipe flange externally to a wall of said inner vessel;

c) aligning said second pipe flange with an aperture located in the wall of said outer vessel, d) passing said elongated tubular member through said aperture and connecting one end of said elongated tubular member to said second pipe flange;

e) attaching the second flange portion of said flexible boot externally to the wall of said outer vessel in a manner whereby said elongated tubular member is centrally located and extends from said second pipe flange longitudinally through said flexible boot; and f) attaching said first pipe flange to said first flange portion of said flexible boot in a manner whereby an end of said elongated tubular member opposite said second pipe flange is located within a socket portion of said first pipe flange.

18. The method according to claim 17 further comprising the step of allowing longitudinal movement of said inlet/outlet fitting assembly, relative to said outer vessel as a result of flexible expansion and contractions of said corrugation portion of said flexible boot.

\* \* \* \* \*